United States Patent [19]

Kanada

[11] Patent Number: 5,091,812

[45] Date of Patent: Feb. 25, 1992

[54] STABILIZING APPARATUS FOR RECORDING AND/OR REPRODUCING APPARATUS OF FLEXIBLE ROTARY RECORDING MEDIUM

[75] Inventor: Tokio Kanada, Tokyo, Japan

[73] Assignee: Sony Corporation, Japan

[21] Appl. No.: 388,850

[22] Filed: Aug. 3, 1989

[30] Foreign Application Priority Data

Aug. 15, 1988 [JP] Japan .................................. 63-202821

[51] Int. Cl.[5] .......................... G11B 25/04; G11B 5/48
[52] U.S. Cl. .................................. 360/130.34; 360/104
[58] Field of Search ............... 360/103, 104, 105, 128, 360/130.3, 130.34, 97.01, 99.01

[56] References Cited

U.S. PATENT DOCUMENTS

| | | | |
|---|---|---|---|
| 4,466,032 | 8/1984 | Saito | 360/99.05 |
| 4,577,251 | 3/1986 | Okada | 360/128 |
| 4,600,955 | 7/1986 | Regruit | 360/106 X |
| 4,620,250 | 10/1986 | Hills | 360/104 |

*Primary Examiner*—David J. Severin
*Attorney, Agent, or Firm*—Ronald P. Kananen

[57] ABSTRACT

A disk stabilizing apparatus employs a low friction pad for restricting the magnitude of curving of the radially outward portion of the disk. The low friction pad is oriented at an upstream portion of a stabilizer plate in a rotating direction of the disk. In addition, the apparatus further employs a stabilizer plate which is tilted upwardly toward the downstream direction in the rotating direction of the disk.

6 Claims, 5 Drawing Sheets

STABILIZING APPARATUS FOR RECORDING AND/OR REPRODUCING APPARATUS OF FLEXIBLE ROTARY RECORDING MEDIUM

BACKGROUND OF THE INVENTION

1. Field of the Invention

The present invention relates generally to a recording and/or reproducing apparatus for a flexible rotary recording medium, such as a flexible magnetic disk. More specifically, the invention relates to an apparatus for stabilizing a recording medium for a writing and/or reading head of the recording and reproducing apparatus. Further particularly, the invention relates to a disk stabilizing apparatus for the recording and/or reproducing apparatus which is suitable for use in an electronic still camera, for example.

2. Description of the Background Art

In the recently developed and marketed electronic still cameras, one field of video data representative of a still image is magnetically recorded on a flexible magnetic disk in a form of a frequency modulated signal. The recording format of the video data signal is of short wavelength. In order to stably transfer data between a magnetic head and the disk, the magnetic head is installed on a stabilizer plate for drawing the disk toward the head by vacuum pressure generated while the disk is driven to rotate.

FIGS. 7, 8, 9 and 10 show conventional constructions of a disk stabilizing mechanism for the recording and/or reproducing apparatus for the flexible magnetic disk. In order to facilitate a better understanding of the invention, the construction of the conventional disk stabilizing mechanism will be briefly discussed with reference to FIGS. 8, 9 and 10. A thin flexible sheet form magnetic disk A is mounted on a stabilizer plate or pad 1 which is formed into a disc shaped configuration. The stabilizer plate 1 is formed with a stabilizer surface 1a toward which the magnetic disk A is to be drawn. An essentially rectangular recess or bore 1b is formed at the center portion of the disc shaped stabilizer plate. A magnetic head 2 is disposed within the recess or bore 1b. The magnetic head 2 is arranged in the recess 1b so that the tip end thereof may project in a magnitude of several tens μm's from the stabilizer surface 1a.

As shown in FIG. 8, the stabilizer plate 1 is designed to be caused shifting together with the magnetic head 2 in the radial direction P by means of a head shifting mechanism 3. Therefore, the magnetic head 2 is shifted to access coaxially or helically arranged recording tracks across the disk. In order to cause radial shifting of the stabilizer plate 1, a head carriage 4 is provided. The head carriage 4 is movably guided by a pair of slide shafts 8a and 8b mounted on an upper chassis 5a and carries the stabilizer plate 1 with the magnetic head 2 in a radial direction. The head carriage 4 is drivingly associated with a tracking motor 9 via a smaller diameter gear 9a and a larger diameter gear 10. The larger diameter gear 10 has a cam plate 10a which is engaged with a cam follower 4a extending from the head carriage 4. The larger diameter gear 10 is engaged with the smaller diameter gear 9a for rotatingly driving the cam plate 10a. By rotation of the cam plate 10a, the cam follower 4a is driven to cause radial shifting of the carriage 4 in a radial direction to determine the position of the magnetic head 2 according to the angular position of the cam plate 10a. Therefore, the stabilizer plate 1 with the magnetic head 2 is shifted toward and away from the rotary shaft of a turn table 7.

While the disk A is driven to rotate by rotation of the turn table 7, a Berboulli drawing force is generated between the disk A and the stabilizer plate 1 for establishing steady contact between the disk and the head. Such technology for stabilizing contact between the magnetic head and the flexible magnetic disk has been disclosed in Curtis R. Regruit U.S. Pat. No. 4,600,955 and Robert G. Hills U.S. Pat. No. 4,620,250, for example.

In such arrangement, if upward curving is caused in the magnetic disk at a radially outward portion as illustrated in FIG. 9, the head receptacle recess is exposed to the atmosphere to cause failure in establishing contact between the magnetic head and the magnetic disk. In order to eliminate a possibility of causing failure in establishing a steady contact between the magnetic head 2 and the magnetic disk A the stabilizer plate 1 is inclined in a radially outward direction R, as shown in FIG. 7. The inclination angle $\theta$ is selected in a range of 1° to 2° for placing the stabilizer surface 1a in a position substantially parallel to the disk surface deflected upwardly. Though this strategy may provide certain improvement in eliminating a possibility of failure in contacting the head 2 onto the disk A, it is still not possible to completely prevent failure of contact between the magnetic head and the magnetic disk due to variation of magnitude and/or angle of curving caused in the disk.

SUMMARY OF THE INVENTION

Therefore, it is an object of the present invention to provide an apparatus for stabilizing a flexible recording medium disk for establishing steady contact between a reading and/or writing head and the recording medium disk despite any angle of disk curving.

In order to accomplish the aforementioned and other objects, a disk stabilizing apparatus, according to the present invention, employs a low friction pad for restricting magnitude of curving of the radially outward portion of the disk. The low friction pad is oriented at an upstream portion of a stabilizer plate in a rotating direction of the disk. In addition, the apparatus further employs the stabilizer plate which is tilted upwardly toward the downstream direction in the rotating direction of the disk.

According to one aspect of the invention, an arrangement for establishing stable contact between an information transfer head means and a flexible recording medium disk in a disk drive apparatus, comprising:

a stabilizer plate supporting the information transfer disk, said stabilizer plate incorporating means for generating a Berboulli drawing force for forcing the disk onto the information transfer head for establishing steady contact therebetween, and the stabilizer plate being inclined toward downstream in relation to a rotational direction of the disk; and a depression pad provided upstream of the information transfer head in a disc rotating direction, and being made of low friction fiber.

According to another aspect of the invention, an arrangement for establishing stable contact between a recording and/or reproducing magnetic head and a magnetic flexible disk for steadily transferring formation therebetween, comprising:

a head stabilizer block defining an air bearing surface around the magnetic head the air bearing surface being inclined toward a downward direction with respect to the disk rotating direction; and a disk stabilizer block provided upstream of the magnetic head with respect to the disk rotating direction, the disk stabilizer block carrying a low friction fabric member contacting with the disk for restricting a curving magnitude of the disk.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
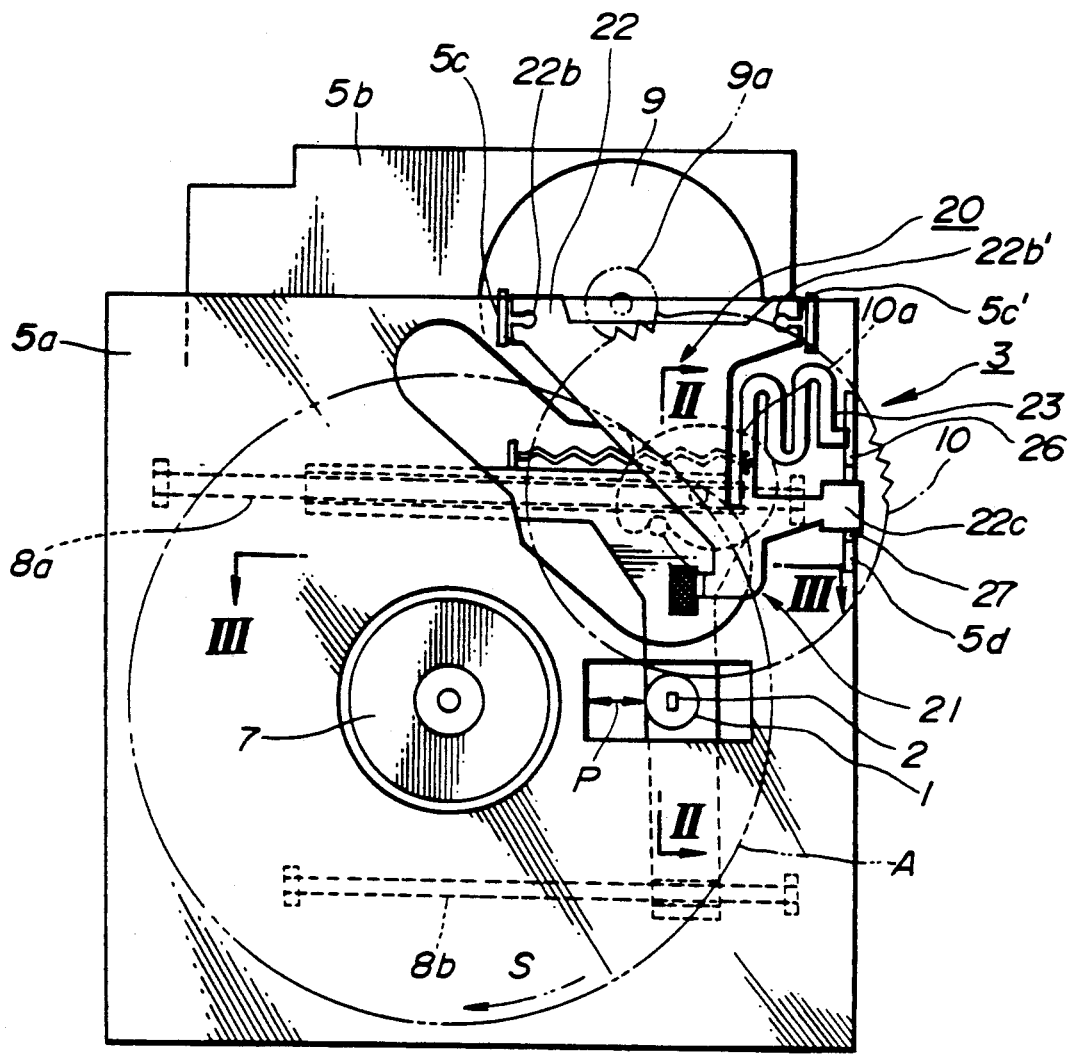
FIG. 1 is a plan view of a disk drive apparatus for a flexible recording medium disk, for which the preferred embodiment of a disk stabilizing arrangement according to the present invention, is applicable.

Referring now to the drawings, particularly to FIG. 1, a disk drive apparatus includes the preferred embodiment of a disk stabilizing arrangement according to the present invention. The preferred embodiment of the disk stabilizing arrangement will be discussed herebelow in terms of an application for a disk drive apparatus of FIG. 1. In the following discussion, the features and components which are common to the previously discussed prior art will be represented by the same reference numerals to that used in the former discussion. Since such common components to the prior art disk drive apparatus have already been discussed in the introduction of the disclosure, the detailed discussion for these component will be neglected in order to avoid redundant discussion which may lead to confusion in understanding the invention.

As shown in FIGS. 1 to 4, the stabilizer plate 1 fixed on the head carriage 4 defines an elongated elliptic recess 1c for receiving therein the magnetic head 2. The upper surface of the stabilizer plate 1 forms a stabilizing surface 1a onto which the flexible magnetic disk A is drawn by a Berboulli drawing force. As can be clearly seen from FIG. 2, the stabilizing surface 1a is inclined, as shown by arrow L, relative to the rotating direction S of the disk at a predetermined angle $\theta$, e.g. 1° to 2°.

On the other hand, a depression pad arrangement 20 is provided at an orientation offset from the magnetic head 2 in the upstream direction as shown by arrow U. The depression pad arrangement 20 comprises a support plate 21 having an essentially triangular plate form main body section 22 and a meandered thin plate form spring section 23 integrally formed with the main body section 22. The support plate 21 is made of a metal. The metallic support plate 21 has a downwardly bent strip section 28 which has a horizontally extending extension 22a extending from the lower end of the downwardly bent strip section. A depression pad 24 is supported on the horizontally extending extension. The depression pad 24 is made of a non-woven fabric of low friction fiber material. The horizontal extension 22a has a curled tip end 22b. The depression pad 24 wraps the horizontal extension 22a together with the curled tip end 22b. In the installation of the depression pad 24 to the horizontally extending section, the curled tip end 22b may serve to provide sufficient tension for the depression pad so that a variation of the depression pad may not result in loosening of the horizontally extending section.

The support plate 21 is provided with pivoting strips 22b at the corners remote from the corner carrying the depression pad 24. The pivoting strips 22b are formed with essentially key hole-like cut-outs 22b'. The pivoting strips 22b are respectively bent downwardly at their tip ends. Essentially T-shaped pins 25 having transversely extending pin heads from a pin body and extended from brackets 5c which vertically extend from upper chassis 5a, and engage with the cut-out 22b for pivotally supporting the support plate 21. With this supporting structure of the support plate 21, the depression pad 24 carried by the tip end thereof can be moved in an essentially vertical direction toward and away from the magnetic disk A as shown by the arrow Z.

The spring section 23 has a free end 23a engaging with a hook section 26 of a vertically extending wall 5d upwardly extending from the upper chassis 5a. The spring section 23 thus engaged to the stationary wall 5d serves as compression spring for exerting biasing force for the support plate 21. In addition, the support plate 21 has a transverse extension having a tip end 22c engaged with a cut-out 27 formed in the vertically extending wall 5d. The tip end 22c is formed to have tilted wings having a tilting angle in conformance with the tilting angle of the edge of the cut-out 27 for establishing firm engagement. The transverse extension in the end of the tip end firmly engaged with the cut-out 27 of the vertically extending wall 5d restricts downward movement of the depression pad 24.

Figure 5:
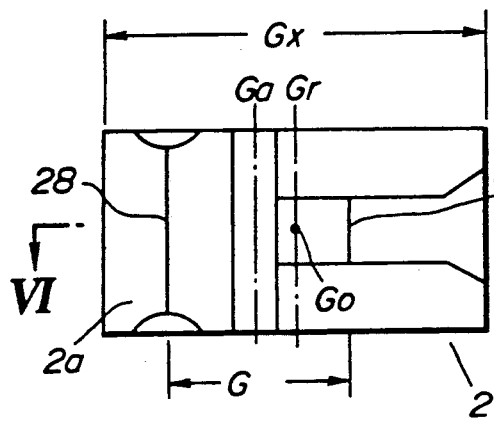
FIG. 5 is a plan view of a magnetic head employed in the disk drive apparatus of FIG. 1.
Figure 6:
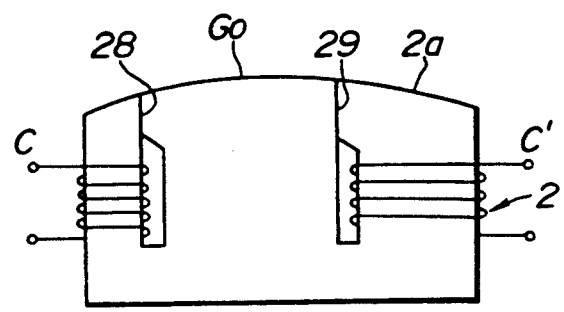
FIG. 6 is a section of the magnetic head taken along line VI—VI of FIG. 5.
Figure 7:
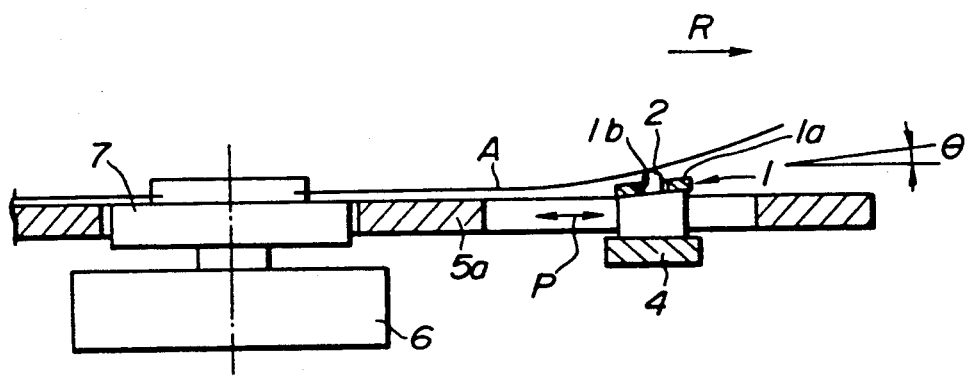
FIG. 7 is a section showing the conventional disk stabilizing arrangement as taken along line VII—VII of FIG. 8.
Figure 8:
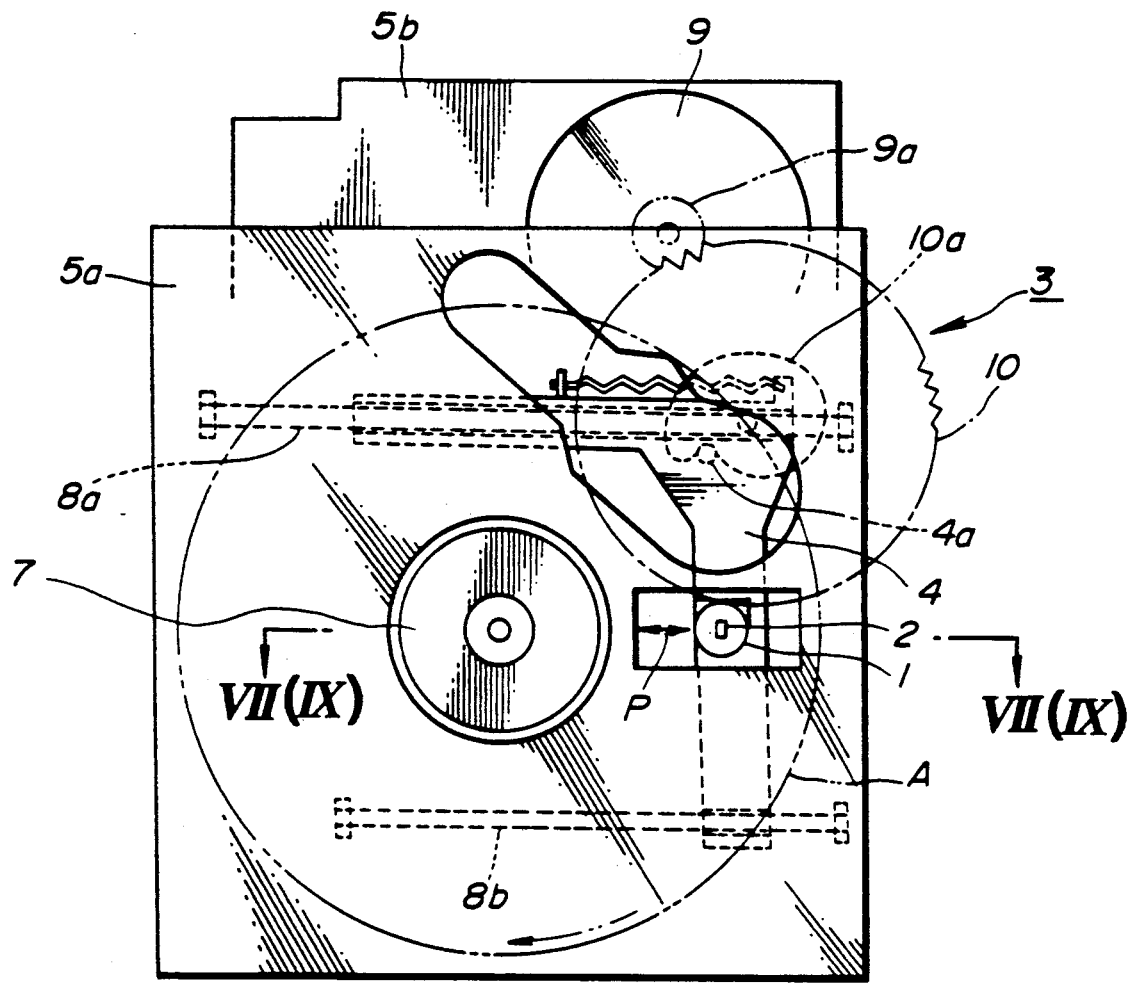
FIG. 8 is a plan view of the conventionally proposed flexible disk drive apparatus.
Figure 9:
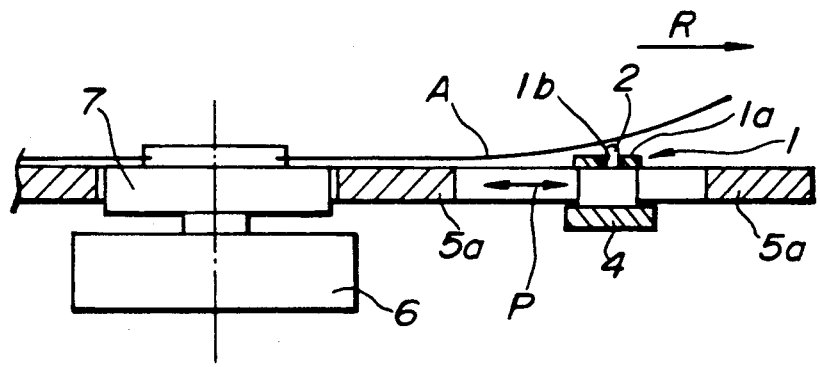
FIG. 9 is a section taken along line IX—IX of FIG. 8.
Figure 10:
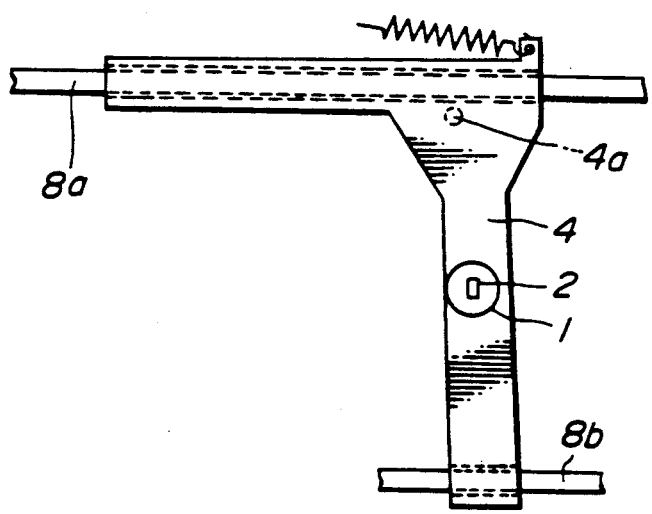
FIG. 10 is a plan view showing magnetic head carriage and guide therefor forming a tracking mechanism of the disk drive apparatus of FIG. 8.

As shown in FIGS. 5 and 6, the magnetic head 2 has an arc-shaped head surface 2a to contact with the disk A. Gaps for an erase head 28 and a read/write head 29 with winding coils C and C' are formed in the head surface 2a with a distance Gl therebetween. A center point Ga between the gaps is offset from the center Gr in the overall length Gx toward the erase head 28. By this arrangement, the top of the arc-shaped head surface 2a is oriented at a position close to the read/write head 29. This reduces spacing loss and establishes improved contact between the read/write head and the disk.

Figure 2:
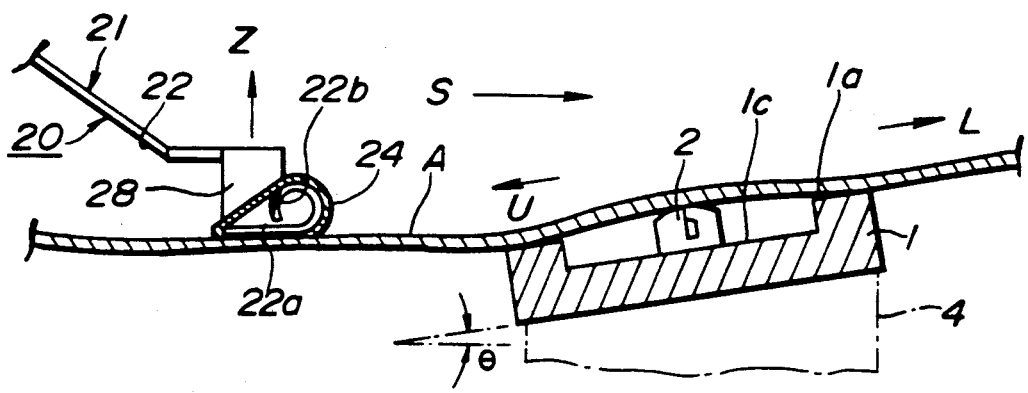
FIG. 2 is a section taken along line II—II of FIG. 1.
Figure 3:
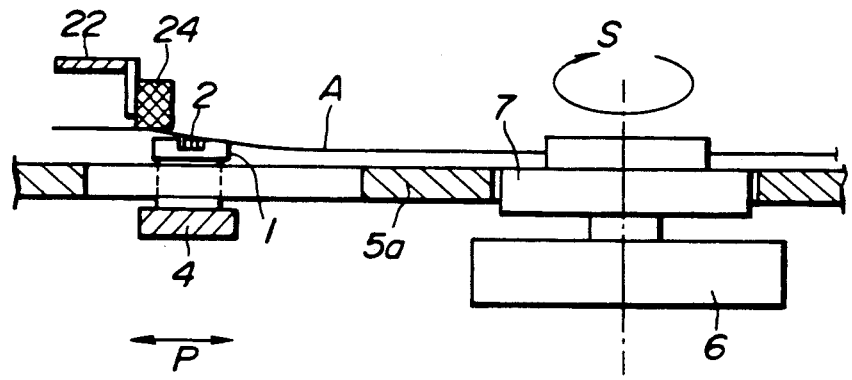
FIG. 3 is a section taken along line III—III of FIG. 1.
Figure 4:
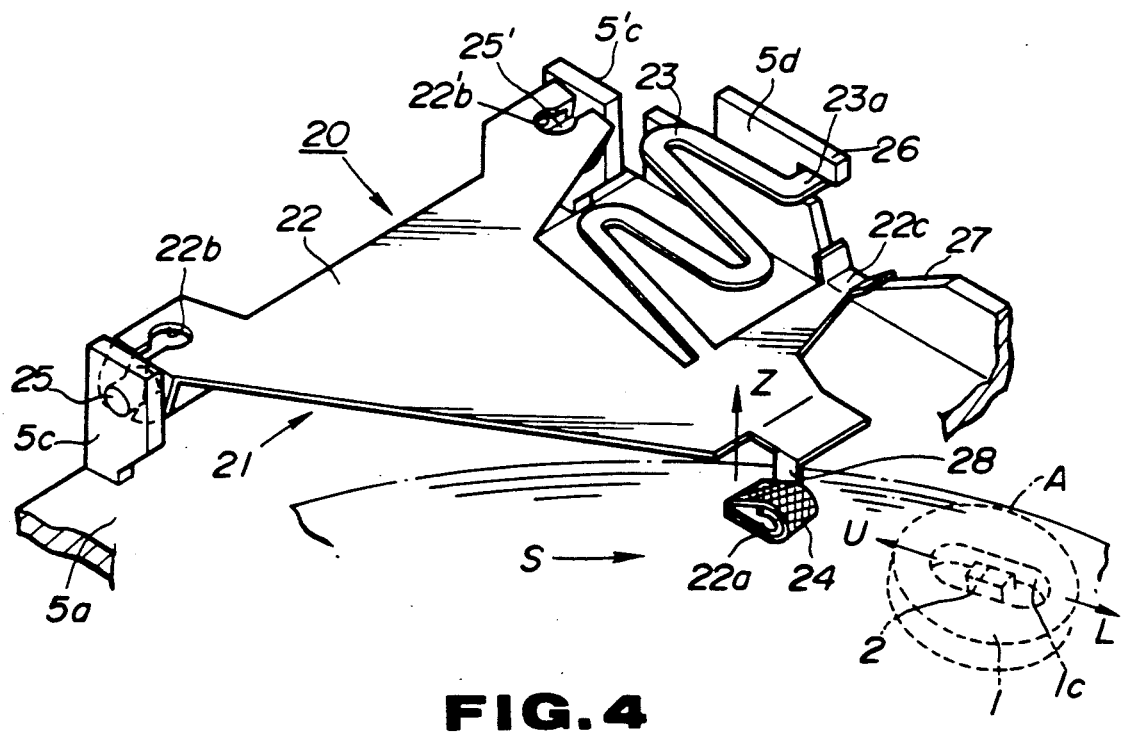
FIG. 4 is a perspective view of the preferred embodiment of the disk stabilizing arrangement of FIG. 1.

With the construction set, in case that the disk drive apparatus is installed in the electronic still camera, a disk chucked on a turn table is driven at high speed by means of a spindle motor to generate a Berboulli drawing force for drawing the disk onto the magnetic disk. At this time, even when the upward curving of the disk A occurs, the depression pad 24 oriented at an upstream side of the magnetic disk successfully reduces the magnitude of upward curving as shown in FIG. 2. Furthermore, by inclining the stabilizer plate 1 upwardly in a downward direction with respect to the disk rotating direction, stable disk and head contact can be established.

In the shown embodiment, though the depression pad is constantly placed in contact with the disk, since the depression pad is formed of a low friction, fiber nonwoven fabric, jitter and so forth will not be caused during recording and reproduction.

In addition, since the depression pad is supported by the supporting plate 21 per se having characteristics for resiliently biasing the depression pad onto the disk A, it does not require an additional member, such as a bias spring for urging the depression pad toward the disk. This makes the construction simple and thus make the cost lower.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment employs a non-woven fabric for forming the depression pad, it may be replaced with any other soft material, such as felt and so forth. Also, though the shown embodiment has been discussed in terms of a disk directly mounted on the turn table, the strategy of the present invention may be applicable for a floppy disk drive for driving a floppy disk housing a flexible disk within a disk jacket. Namely, for example, the present invention may be applicable for the disk drive apparatus as disclosed in U.S. Pat. No. 4,466,032.

What is claimed is:

1. An arrangement for establishing stable contact between an information transfer head and a flexible recording medium disk in a disk drive apparatus, comprising:
   a stabilizer plate supporting said recording medium disk, said stabilizer plate incorporates means for generating a Berboulli drawing force for forcing said disk onto said information transfer head for establishing steady contact therebetween, and said stabilizer plate being inclined toward a downstream direction with respect to the disk rotating direction;
   a disk stabilizer block provided upstream of said information transfer head with respect to said disk rotating direction for restricting a curving magnitude of said disk; and
   wherein said disk stabilizer block is formed of a metal material and incorporates a meandering spring formed integrally therewith; and
   a depression pad placed on said disk stabilizer block said depression pad being made of low friction fiber and contacting a side of said disk.

2. An arrangement for establishing stable contact between a recording and/or reproducing magnetic head and a magnetic flexible disk for steadily transferring information therebetween, comprising:
   a head stabilizer block defining an air bearing surface around said magnetic head, said air bearing surfaces being inclined toward a downward direction with respect to a plane bearing the disk rotating direction, said head and said stabilizer block contacting a surface of said disk; and
   a disk stabilizer block contacting an opposite surface of said disk provided upstream of said magnetic head with respect to said disk rotating direction, said disk stabilizer block carrying a low friction fabric member contacting said disk for restricting a curving magnitude of said disk, wherein said disk stabilizer block is formed of a metal material and incorporates a meandering spring formed integrally therewith.

3. An arrangement as set forth in claim 2, wherein said fabric member is made of a non-woven fabric.

4. An arrangement as set forth in claim 2, wherein said non-woven fabric is provided for wrapping a part of said disk stabilizer block.

5. An arrangement as set forth in claim 2, wherein said disk stabilizer block is provided within a range over which said magnetic head radially shifts with respect to said disk and in the vicinity of the outer periphery of the disk.

6. An arrangement for establishing stable contact between a recording and/or reproducing magnetic head and a magnetic flexible disk for steadily transferring information therebetween, comprising:
   a head stabilizer block defining an air bearing surface around said magnetic head, said air bearing surface being inclined toward a downward direction with respect to a plane bearing the disk rotating direction, said head and said stabilizer block contacting a surface of said disk; and
   a disk stabilizer block contacting an opposite surface of said disk provided upstream of said magnetic head with respect to said disk rotating direction, said disk stabilizer block carrying a low friction non-woven fabric member contacting said disk for restricting a curving magnitude of said disk, said disk stabilizer block is formed of a metal material and incorporates a meandering spring formed integrally therewith.

* * * * *